United States Patent [19]
Vallance

[11] 3,741,288
[45] June 26, 1973

[54] PREFORMED SEAL ASSEMBLY FOR A GAS TURBINE REGENERATOR

[75] Inventor: James K. Vallance, Dearborn Heights, Mich.

[73] Assignee: Ford Motor Company, Dearborn, Mich.

[22] Filed: June 25, 1971

[21] Appl. No.: 156,673

[52] U.S. Cl. .................................................. 165/9
[51] Int. Cl. .......................................... F23l 15/02
[58] Field of Search ................................... 165/7, 9

[56] References Cited
UNITED STATES PATENTS

| | | | |
|---|---|---|---|
| 3,190,350 | 6/1965 | Chute | 165/9 |
| 3,622,737 | 11/1971 | Trudeau | 165/9 |
| 3,559,725 | 2/1971 | Fucinari et al | 165/7 |

Primary Examiner—William E. Wayner
Attorney—John R. Faulkner and Glenn S. Arendsen

[57] ABSTRACT

A crossarm member extending across the regenerator has one surface in sliding contact therewith and the other surface spaced a short distance away from an inwardly projecting ridge of the regenerator cover. A foil has one edge attached to the crossarm member and the other edge projects outward to contact the ridge. The central portion of the foil has a preformed step adjacent the welded edge and is wider than the end portions to accommodate pressure and temperature induced movement of the cover away from the regenerator during engine operation.

11 Claims, 6 Drawing Figures

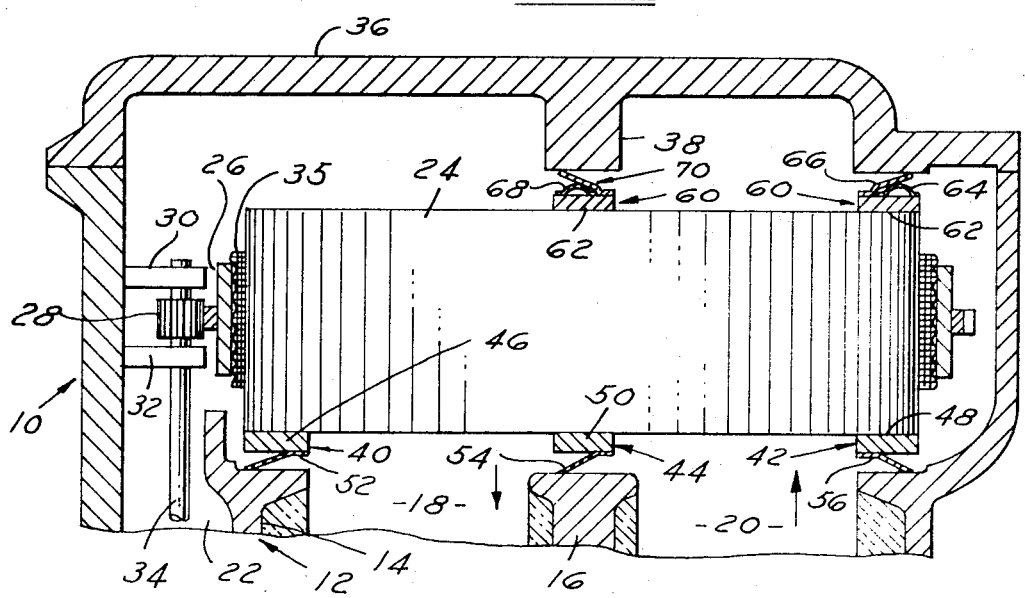

# 3,741,288

PREFORMED SEAL ASSEMBLY FOR A GAS TURBINE REGENERATOR

SUMMARY OF THE INVENTION

Ceramic materials being used to make rotary regenerators for gas turbine engines permit engine operation at increased temperatures and thereby improve significantly engine performance and economy. The high operating temperatures increase the relative thermal growth between the metal engine housing and the ceramic regenerator, however, and prior techniques of sealing appropriate junctions of the regenerator and the housing have applied extremely high stresses to the regenerator, the seals and the housing. High gas pressures also are desirable in such engines and the pressure differentials applied to engine components surrounding the regenerator accentuate the sealing difficulties. For example, a pressure differential of approximately 4 atmospheres is applied to a relatively large portion of the regenerator cover and the force produced thereby causes considerable cover deflection that adds to sealing difficulties.

This invention provides a sealing system for a rotating regenerator of a gas turbine engine that is capable of effectively sealing the junctions of the regenerator and the housing over a wide range of temperature and pressure induced dimensional changes. The sealing system comprises a shoe having one surface sliding on the regenerator. One longitudinal edge of a foil member is attached to the shoe so that its other longitudinal edge projects away therefrom to contact a component of the engine housing. At least a portion of the foil contains a preformed step adjacent the attached edge of the foil. This preformed step maintains the projecting foil edge in proper sealing contact despite considerable dimensional changes between the seal and the housing during engine operation without undue stress formation.

One highly effective application of the invention is in the crossarm seal assembly between the regenerator and its exterior cover member, which forms part of the engine housing. This crossarm seal assembly extends generally across a diameter of the regenerator surface just below an inwardly projecting ridge of the cover member to divide the regenerator surface into two sectors, one conducting air at high pressure and moderate temperature from the engine compressor and the other conducting exhaust gases at approximately atmospheric pressure and high temperature. Central portions of the regenerator and the cover member operate at an extremely high temperature and the cover member is subjected to a large pressure differential. These factors combine to produce considerable dimensional changes between the central portions of the regenerator and the cover member which actually bow the central portion of the cover member away from the regenerator. The projecting edge of the foil of this invention is held in contact with the ridge of the cover member by the pressure differential between the sectors, and the step in the foil maintains adequate sealing contact throughout the dimensional changes.

The central portion of the foil of the crossarm seal assembly preferably also is wider than its end portions. Both the preformed step and the increased width of the central portion blend smoothly with the end portions of the foil. Numerous materials can be used to make the foil; stainless steel usually provides the best combination of economy, ease of fabrication, and performance.

Stainless steel or nickel alloys can be used to make the shoe.

An additional foil having an arcuate cross section can be located below the projecting foil to provide initial lift to the projecting foil and to stiffen the projecting foil, if necessary. This arcuate foil can be located on the shoe by welding or numerous other techniques, the easiest of which involves loosely placing the foil on the shoe and retaining it in place by a stud extending through the foil and the shoe.

BRIEF DESCRIPTION OF THE DRAWINGS

FIG. 1 is a sectional view through the regenerator portion of a gas turbine engine showing the relationship of a disc-shaped rotating regenerator to the engine housing and the regenerator cover. FIG. 2 is a plan view of the sealing system between the regenerator and the cover showing the increased width of the central portion of the foil.

DETAILED DESCRIPTION

Figure 3:
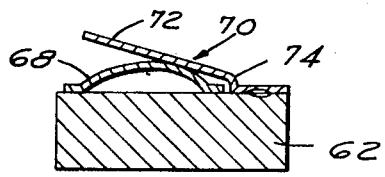
FIG. 3 is a sectional view taken along line 3—3 of FIG. 2 to show the relationship of the foil to the shoe at the central portion of the crossarm assembly and FIG. 4 is a view taken along line 4—4 of FIG. 2 to show the relationship of the foil to the shoe at the end portions of the crossarm assembly. The views of FIGS. 5 and 6 are similar to those of FIGS. 3 and 4 respectively of an alternate embodiment in which a support bar is located above the welded edge of the foil to sandwich the foil against the shoe.

Referring to FIG. 1, a gas turbine engine containing the sealing system of this invention has an eliptically shaped metal outer housing 10 that is open at the top of the regenerator portion (FIG. 1 is sectioned along the major diameter of the ellipse). A smaller inner housing 12 is located inside housing 10 and terminates a short distance from the opening thereof. Inner housing 12, which can be integral with the outer housing, comprises an outer cylindrical wall 14 divided diametrically by a wall 16 into two semi-circular passages 18 and 20. Wall 14 forms an annular passage 22 between a part of its circumference and housing 10.

A disc-shaped regenerator 24 is mounted rotatably above inner housing 12. An annular ring gear 26 surrounds the regenerator 24 and meshes with a pinion gear 28 that is supported on the inner surface of housing 10 by projecting bosses 30 and 32. Pinion gear 28 is driven by the gas turbine engine through a shaft 34 located in annular passage 22 and the pinion gear in turn drives regenerator 24 through ring gear 26 and an appropriate torque transmitting member 35. A metal cover 36 is attached to outer housing 10 by conventional means (not shown) and covers the open portion of the outer housing. Cover 36 has a downwardly projecting ridge 38 that is aligned with diametrical wall 16.

An inner sealing system consisting of two peripheral seal assemblies 40 and 42 and an inner crossarm seal assembly 44 seals appropriate spaces between the inner surface of regenerator 24 and inner housing 12. Each of seal assemblies 40, 42 and 44 includes a respective shoe 46, 48 and 50 having one surface sliding against the regenerator. Opposite surfaces of each shoe have one edge of a respective foil 52, 54 and 56 attached thereto. The outer edge of each foil projects toward an appropriate surface of inner housing 12.

An outer seal assembly 60 seals appropriate junctions between the outer surface of regenerator 24 and cover 36. Referring also to FIG. 2, outer seal assembly 60 comprises a D-shaped shoe 62 having a peripheral portion extending around the right sector of regenerator 24 and a crossarm portion extending across the regenerator below ridge 38. One surface of shoe 62 slides against the outer surface of regenerator 24. The other surface of the peripheral portion can have both edges of a curved foil 64 attached thereto. One edge of a projecting foil 66 is attached to the inner portion of the outer surface of the peripheral portion and its projecting edge extends upward and outward to contact cover 36.

The outer surface of the crossarm portion of shoe 62 also has both edges of an arcuate foil 68 positioned thereon. One edge of a preformed foil 70 is attached to the right side of the outer surface of the crossarm portion of shoe 62 and its other edge projects upward and outward to contact ridge 38. The longitudinal ends of the foil curve smoothly into contact with the ends of the foil on the peripheral portion. A stud (not shown) extends through hole 71 of foil 70 and aligned holes of foil 68 and shoe 62 during engine assembly to retain foil 68 in place.

Figure 4:
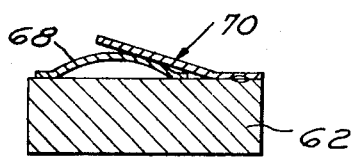

Referring to FIGS. 3 and 4 also, the end portions of foil 70 project smoothly away from the crossarm portion of shoe 62 at a substantially constant angle for the entire width of the foil. The central portion of foil 70 initially projects away from the shoe 62 at a greater angle for a short distance and then curves into an extended portion 72, thereby forming a preformed step 74 that is adjacent the welded edge (FIG. 3). Extended portion 72 continues at a substantially constant angle to contact ridge 38.

During engine operation, relatively cool air from the engine compressor (not shown) flows up passage 22 and is turned downward by the front portion of cover 36 into the porous front sector of rotating regenerator 24. The air passing through the front sector of regenerator 24 flows downward in passage 18 to the engine combustion chamber (not shown). Hot combustion gases from the combustion chamber pass initially through the turbine wheels (not shown) and then flow upward through passage 20, the right sector of regenerator 24 and into the space surrounded by the outer seal assembly from which the gases eventually are dissipated into the atmosphere.

The air in passage 22 extends around the entire periphery of regenerator 24 and usually is at a pressure of at least about 4 atmospheres. Exhaust gases in passage 20 typically are just slightly above atmospheric pressure but are at a high temperature, usually about 1,300°F. Heat transferred from the exhaust gases to the air passing through the left sector of regenerator 24 raises the temperature of the air flowing in passage 18 to a temperature exceeding about 1,000°F.

Regenerator 24 and its associated seal assemblies thus achieve a relatively high temperature during engine operation. In addition, a portion of cover 36 is subjected to a pressure differential of approximately 4 atmospheres and the combined force of this pressure differential with the thermal expansion differences between the regenerator and the cover member produce considerable dimension changes between the outer surface of regenerator 24 and ridge 38. Preformed step 72 in the central portion of foil 70 maintains the projecting edge of the foil in contact with ridge 38 throughout such dimensional changes without imposing undue stresses either on the foil itself or at the rubbing surface of shoe 62 and regenerator 24. The preformed step also reduces the moment applied to the welds attaching the foil to the shoe and converts some of the tensile forces acting on the welds into shear forces.

Good sealing ability over a wider range of dimensional changes can be achieved by increasing the width of the central portion of the foil over the width of its end portions as shown in FIG. 2. The end portions of foil 70 typically project away from shoe 62 at a substantially constant angle of about 15° and the projecting part of the foil at the end portions typically is about 0.8 inch. The central portion of the foil projects away from the shoe at an angle of about 30°–75° initially and its projecting part has a maximum width of about 1.3 inches. An initial projection of about 60° in the central portion has been found to produce excellent results.

Figure 5:
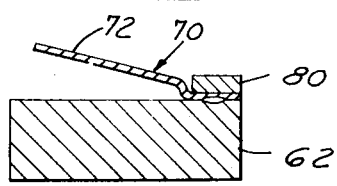
Figure 6:
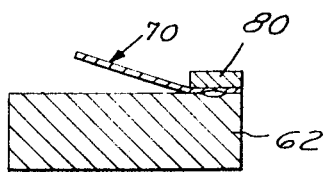

As shown in FIGS. 5 and 6, a support bar 80 can be welded to the entire length of the welded edge of the foil. Bar 80 contacts the foil above the point at which the foil curves away from the shoe and thereby reduces the moment of the forces applied to the weld.

Thus this invention provides a sealing system for a rotating regenerator of a gas turbine engine that has high sealing effectiveness over a wide range of dimensional changes and does not impose undue stresses on the engine components. The sealing system also reduces force moments on its welded components and converts a considerable portion of the tensile forces acting on the welds into shear forces.

I claim:

1. In a gas turbine engine having a regenerator rotating in a housing with portions of said regenerator being subjected to gas streams of different pressures, a sealing system for said regenerator comprising a shoe member having one surface sliding on said regenerator, and a foil member having one longitudinal edge attached to said shoe member and the other longitudinal edge projecting away from the shoe member to contact said housing, the central portion of said foil member having a preformed step adjacent the edge attached to said shoe member and the end portions of said foil member projecting smoothly away from the shoe member.

2. The engine of claim 1 in which the central portion of the foil member is wider than its end portions.

3. The engine of claim 2 in which said one longitudinal edge of the foil member is welded to the shoe member.

4. The engine of claim 3 in which the end portions of the foil member project away from the shoe member at an angle of about 10°–15° and the central portion projects initially at an angle of about 30°–75°.

5. The engine of claim 4 in which the housing comprises a cover member located outward of said regenerator, said cover member having an inwardly projecting ridge extending across the regenerator, said foil member having its projecting longitudinal edge in contact with said ridge.

6. The engine of claim 5 comprising an arcuate foil extending longitudinally along said shoe member on the same side as said foil member, said arcuate foil having both of its longitudinal edges contacting said shoe member.

7. The engine of claim 6 comprising a support bar extending along and in contact with the welded edge of the foil member, said support bar being welded to said foil member.

8. The engine of claim 1 in which the end portions of the foil member project away from the shoe member at an angle of about 10°–15° and the central portion projects initially at an angle of about 30°–75°.

9. The engine of claim 1 in which the housing comprises a cover member located outward of said regenerator, said cover member having an inwardly projecting ridge extending across the regenerator, said foil member having its projecting longitudinal edge in contact with said ridge.

10. The engine of claim 1 comprising an arcuate foil extending longitudinally along said shoe member on the same side as said foil member, said arcuate foil having both of its longitudinal edges contacting said shoe member.

11. The engine of claim 1 comprising a support bar extending along and in contact with the welded edge of the foil member, said support bar being welded to said foil member.

* * * * *